Patented July 10, 1928.

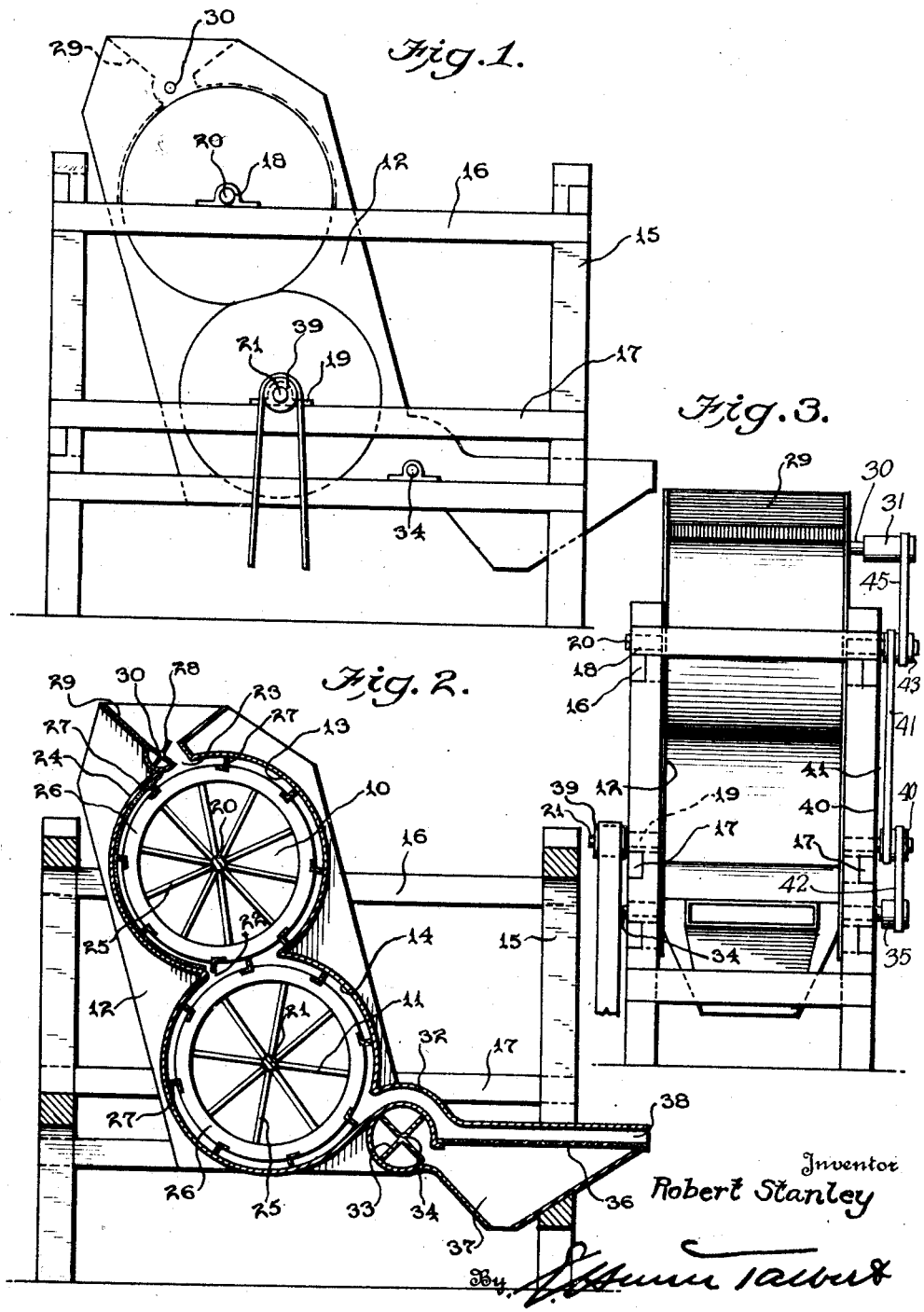

1,677,111

UNITED STATES PATENT OFFICE.

ROBERT STANLEY, OF DE WITT, IOWA.

OAT HULLER.

Application filed May 22, 1926. Serial No. 110,937.

The object of the invention is to provide a simple and yet effective machine for the separation of grain from its chaff, so that the grain may be delivered at the discharge end in clean condition and the chaff directed through an appropriate waste discharge; to provide an effective initial feeding means operatively connected with the hulling means; and to provide a blower at the delivery end operatively connected with the hulling means and serving to positively direct the chaff through a waste outlet and the grain through a delivery outlet.

With this object in view, the invention consists in a construction and combination of parts of which a preferred embodiment is illustrated in the accompanying drawings, wherein:

Figure 1 is a side elevational view of the invention.

Figure 2 is a central vertical longitudinal section view.

Figure 3 is an end elevational view.

The crushing and separating cylinders 10 and 11 are disposed with the former above the latter, the axes of rotation of the two being in an inclined plane and both being enclosed in a housing 12 defining chambers 13 and 14 in which the cylinders are respectively located. The casing is carried by a frame 15 on the side bars 16 and 17 of which are mounted bearings 18 and 19 for the shafts 20 and 21 of the two cylinders, the shafts extending through the side walls of the housing to reach the bearings.

The cylinders both rotate in the same direction—that is, both have angular movement in the same direction, so that at the point where the peripheries are adjacent (the opening 22 between the chambers 13 and 14) they are moving in opposite directions. Thus, as the grain is transferred from the chamber 13 to the chamber 14 through the opening 22, it is cast by the cylinder 10 with great force against the cylinder 11, and the former cylinder having crushed the hulls, the latter cylinder by impact effectively separates the hulls from the grain.

The cylindrical wall of the chamber 13 from the inlet 23 to the outlet opening 22 is provided with a reticulated covering 24 serving to retard movement of the grain around the cylindrical surface of the chamber. Thus, the grain is retarded so that the transverse ribs of the crushing cylinder may effectively crush the hulls. Both cylinders 10 and 11 are in the form of spiders 25 of which the rims 26 are spanned by bars 27, the latter being preferably of angular form with one flange bolted to the peripheral edges of the rims and the remaining flange being disposed radially of the spiders for edge contact with the grain admitted to the chamber 13.

In the feed or intake opening 23 there is disposed a force feed device consisting of a bladed feed roll 28 disposed at the bottom of a hopper 29, the feed roll being mounted on a shaft 30 which, exterior to the hopper, carries a pulley 31 by means of which the shaft is rotated. The deposit of the grain in the hopper 29 and the rotation of the feed roll 28 serves to force the grain down through the intake opening 23, when it is taken up by the cylinder 10 and the hulls crushed, after which it is transferred, as aforesaid, to the cylinder 11 which, having separated the hulls from the grain by impact with the bars 27 thereon, then transfers the whole to a discharge chute 32 through the bottom wall of which an air blast is directed by means of the blower 33, the latter being carried on a shaft 34 which is provided with a pulley 35. Beyond the blower 33, the chute 32 is provided with a screen insert 36 through which the grain passes to a discharge chute 37, the hulls and chaff being directed on through the chute to a waste outlet 38.

Motion is communicated to the whole by means of a belt connecting a driver to the pulley 39 mounted on the shaft 21. At the opposite end the shaft 21 carries a pulley 40 over which travels a belt 41, as well as a belt 42, the former extending around the pulley 43 of the shaft 20 and the latter around a pulley 35 on the shaft 34. A belt 45 trained over the pulley 31 of the feed roll 28 serves to communicate motion to the feed roll from the shaft 18 because of said belt being trained over the pulley 43. Obviously, the feed roll, the two cylinders and the fan are put in motion upon the starting of the driving motor which, as aforesaid, is operatively connected to the shaft 21.

The invention having been described, what is claimed as new and useful is:

1. An oat huller comprising substantially tangentially arranged crushing and separating cylinders, chambers in which said cylinders are mounted, the chambers being in communication at the point of tangency of the cylinders, and means for rotating the cylinders in relative reverse directions at the point of tangency, both cylinders having co-acting members moving in reverse directions at the point of communication between the chambers, those of the crushing cylinder casting the moving grain against those of the separating cylinder and intensifying the separating action as it passes from the chamber of the one to the chamber of the other.

2. An oat huller comprising substantially tangentially arranged crushing and separating cylinders, chambers in which said cylinders are mounted, the chambers being in communication at the point of tangency of the cylinders, and means for rotating the cylinders in relative reverse directions at the point of tangency, both cylinders having co-acting members moving in reverse directions at the point of communication between the chambers, those of the crushing cylinder casting the moving grain against those of the separating cylinder and intensifying the separating action as it passes from the chamber of the one to the chamber of the other, the crushing cylinder chamber being provided with a reticulated retardation device extending around the crushing cylinder for a portion of its periphery.

3. An oat huller comprising substantially tangentially arranged crushing and separating cylinders, chambers in which said cylinders are mounted, the chambers being in communication at the point of tangency of the cylinders, and means for rotating the cylinders in relative reverse directions at the point of tangency, both cylinders having co-acting members moving in reverse directions at the point of communication between the chambers, those of the crushing cylinder casting the moving grain against those of the separating cylinder and intensifying the separating action as it passes from the chamber of the one to the chamber of the other, the crushing cylinder chamber having a feed hopper in communication therewith and a reticulated retardation device extending around the crushing cylinder on one side from the feed hopper to the point of communication between said chambers.

4. An oat huller comprising substantially tangential crushing and separating cylinders of which the peripheries are defined by axial bars, chambers in which said cylinders are mounted, the chambers being in communication at the point of tangency of the cylinders, and means for effecting synchronous movement of the cylinders in reverse directions at the point of tangency, whereby the axial bars of the crushing cylinder may cast the moving grain against the bars of the separating cylinder and intensify the separating action at the time of transfer of the grain from the chamber of the one cylinder to the chamber of the other.

5. An oat huller comprising substantially tangential crushing and separating cylinders of which the peripheries are defined by axial bars, chambers in which said cylinders are mounted, the chambers being in communication at the point of tangency of the cylinders, and means for effecting synchronous movement of the cylinders in reverse directions at the point of tangency, whereby the axial bars of the crushing cylinder may cast the moving grain against the bars of the separating cylinder and intensify the separating action at the time of transfer of the grain from the chamber of the one cylinder to the chamber of the other, the cylinders being timed so that the bars of the one move in intercurrent relation with the bars of the other.

In testimony whereof he affixes his signature.

ROBERT STANLEY.